May 24, 1949.  E. L. SCHENCK  2,471,043
TREATING WASTE RUBBER, ETC
Filed June 19, 1945  3 Sheets-Sheet 1
*Fig. 1.*
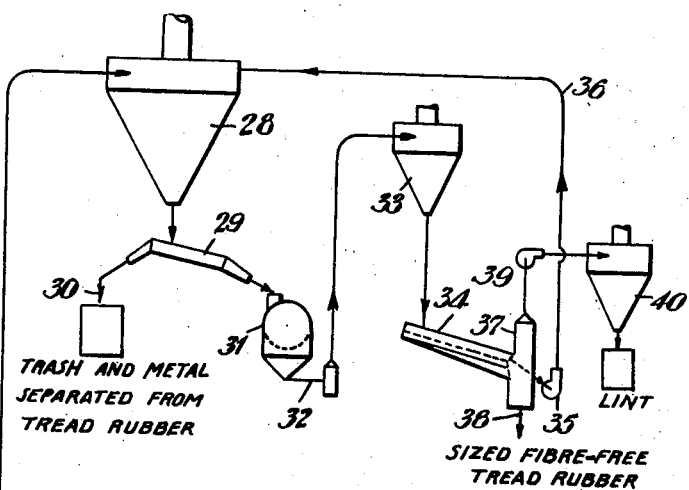
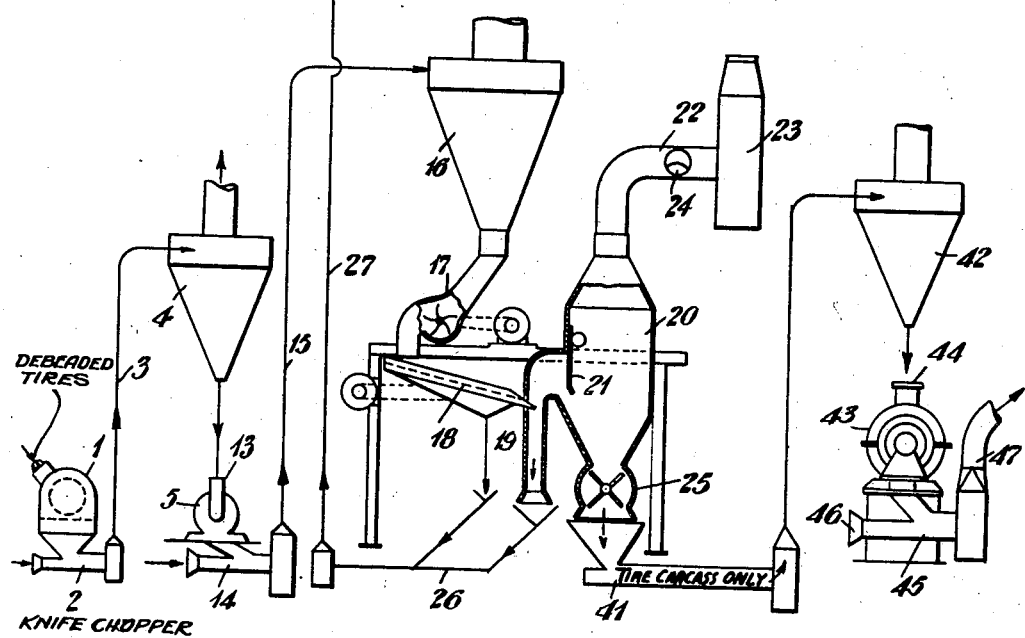
INVENTOR
EDWARD L. SCHENCK
BY
Pennie Davis Marvin V Edmonds
ATTORNEYS May 24, 1949.  E. L. SCHENCK  2,471,043
TREATING WASTE RUBBER, ETC
Filed June 19, 1945  3 Sheets-Sheet 2

INVENTOR
EDWARD L. SCHENCK
BY
ATTORNEYS

May 24, 1949.　　　　E. L. SCHENCK　　　　2,471,043
TREATING WASTE RUBBER, ETC

Filed June 19, 1945　　　　　　　　　　　　　3 Sheets-Sheet 3

INVENTOR
EDWARD L. SCHENCK
BY
Pennie Davis Marvin V Edmonds
ATTORNEYS

Patented May 24, 1949

2,471,043

UNITED STATES PATENT OFFICE 2,471,043

TREATING WASTE RUBBER, ETC.

Edward L. Schenck, Hughesville, Pa., assignor of one-fourth to Benjamin Epstein, one-fourth to Leonard Sylvan Epstein, and one-fourth to Stanley William Epstein, all of Norfolk, Va.

Application June 19, 1945, Serial No. 600,353

8 Claims. (Cl. 241—14)

This invention relates to improvements in a process for the treatment of waste rubber and the like and more particularly to the treatment of rubber tires to separate the tread rubber from the carcass rubber and to separate the fibres of the carcass from the rubber.

While the invention in some of its broader aspects is applicable to the separation of plastics other than rubber from adhering fabrics, it is particularly advantageous for the treatment of old rubber tires. It involves a mechanical separation of the tread rubber from the carcass rubber and carcass fibres to give a granular carcass rubber product substantially free from fibres and from friction rubber, and the separation of the friction rubber of the carcass from the fibres of the carcass to give a friction rubber product in granular form substantially free from tread rubber and from fibres and to give fibre products in the form of substantially rubber-free threads or fibres and lint.

The improved process of the invention includes a series of steps or operations carried out at relatively low temperatures so that injury to the rubber by over-heating is avoided, with cooling of the rubber while undergoing mechanical treatment and pneumatic separation and transportation of the products at various steps of the process.

In general, the improved process includes removing the beads from the tires, cutting or chopping the debeaded tires into fairly coarse pieces, subjecting these pieces to a regulated mechanical stripping treatment to separate the tread rubber in coarse granular form from the carcass and leaving the pieces of carcass freed from tread rubber, separating metal, etc., from the coarse granular tread rubber, further reducing the size of the coarse granular tread rubber and separating by screening or sizing and subjecting the sized tread rubber to de-linting treatment. The process further includes the further treatment of the pieces or chunks of carcass, after the tread stock has been removed therefrom by a mechanical disintegrating or stripping treatment which separates the friction stock from the carcass and separates the threads and fibres of the carcass from the rubber with subsequent separation of the rubber and threads or fibres and recovery of the threads or fibres in substantially rubber-free condition, and with screening or sizing of the separated friction rubber and a final de-linting treatment to give the friction rubber in a granular form substantially free from tread rubber and from fibres.

The invention is applicable to tires made of natural or synthetic rubber and in general it is desirable that the tires to be subjected to the process should be first sorted so that natural rubber tires are separately treated and synthetic rubber tires are separately treated.

It will be understood that automobile tires are made of a series of plies of fabric or of cords coated and secured together by friction rubber with the outer layer of tread stock applied thereto and the whole tire vulcanized so that the tires are made up of a carcass portion with the cords or fabric coated and secured together by the friction rubber and with the tread rubber united to the friction rubber of the carcass. The tread rubber is of a higher specific gravity and of different properties as to elasticity and friability from the friction rubber, the tread rubber usually being heavily loaded with pigment, such as carbon black, etc. Friction rubber is usually made largely of rubber with only a small amount of compounding ingredients. In the present process advantage is taken of the different characteristics of the different kinds of rubber as to adhesion, elasticity and friability, etc.

The invention will be further described in connection with the accompanying drawings which are of a somewhat conventional and diagrammatic character but it will be understood that the invention is illustrated thereby but is not limited thereto.

In the accompanying drawings:

Figs. 1 and 2 together show a layout or flow sheet somewhat conventional and diagrammatic in character of the various parts of the apparatus shown conventionally, this layout or flow sheet illustrating the complete process for treating, e. g., rubber tires to recover the friction-free tread stock, the tread-free friction stock and the threads or fibres and lint as products of the operation.

In the flow sheet illustrated the debeaded tires are supplied to the chopper 1 which may consist of a rotor of knives surrounded by stationary or bed knives and coarse screens, this chopper reducing the debeaded tire to fairly coarse pieces larger than those used by conventional reclaimers with other processes. These pieces may, for example, approximate 3½" long by 1½" wide and of the thickness of the tire. These coarse pieces of tire may vary somewhat in size and the approximate size indicated is given by way of illustration and as an average size.

From this chopper the fairly coarse pieces of tire fall into the air conduit 2 and are carried by an air current through the line 3 to the cyclone collector 4. This material is cooled by the air in which it is entrained and is delivered in a cool, uniform state from the cyclone collector 4, to a stripping mill 5 which is shown as a single disc stripping attrition mill, one form of which is illustrated in Figs. 3 to 6. This stripping attrition mill is equipped with special intermeshing pointed tooth plates which are so adjusted and spaced from each other that the teeth will strip the tread rubber or the friable rubber from the carcass or elastic portion of the material without appreciably reducing the elastic portion of the material in size. The tread rubber stripped from the carcass will be somewhat reduced in size to give a coarse granular tread rubber product.

Figure 3:
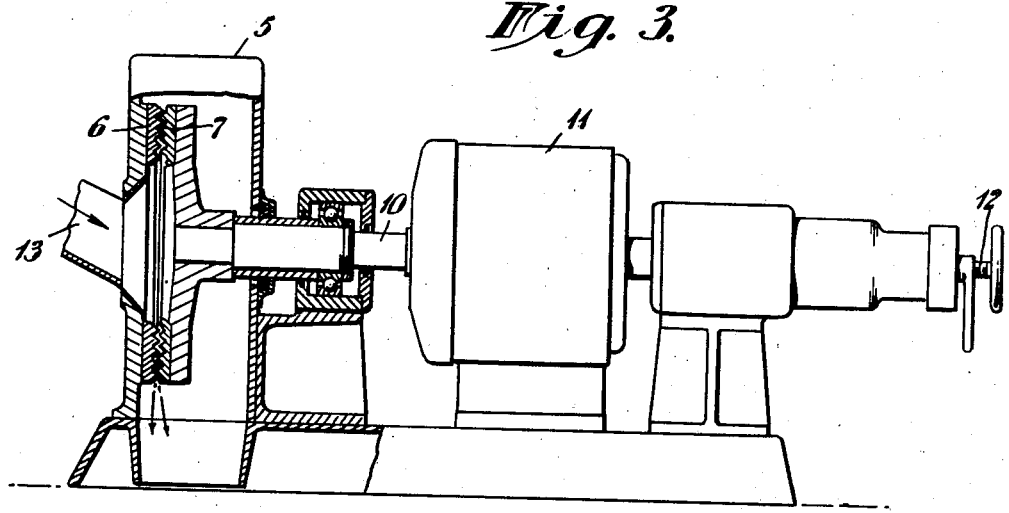
Fig. 3 shows one form of grinder or stripping attrition mill for stripping the tread rubber from the pieces of carcass.
Figure 4:
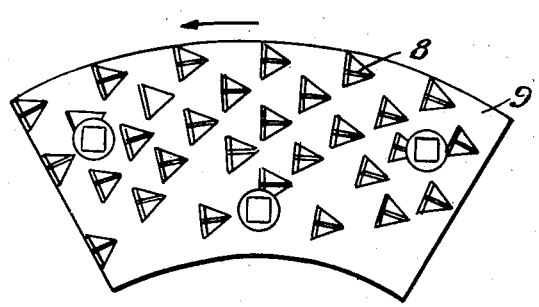
Fig. 4 illustrates one form of toothed plate of the apparatus of Fig. 3.
Figure 5:
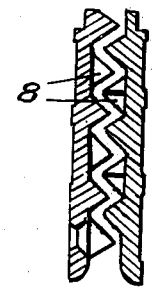
Fig. 5 is an enlarged radial section showing the teeth of the apparatus of Fig. 3.
Figure 6:
Fig. 6 is an elevation of one form of tooth of this apparatus.

As illustrated in Fig. 3, the single disc stripping attrition mill 5 has a stationary toothed plate 6 and a rotary toothed plate 7. The teeth 8 of these plates are further illustrated in Figs. 4, 5 and 6, Fig. 4 showing a section 9 of one of the plates. The rotary toothed plate 7 is mounted on shaft 10 and driven by motor 11 with an adjustable device such as an adjusting screw 12 for adjusting the distance between the stationary and rotating toothed plates, this adjustment permitting spacing of the intermeshing teeth so that the carcass with its soft and elastic friction rubber will pass through without appreciable disintegration, while the tread rubber will be stripped therefrom as a coarse granular product.

The inlet 13 of the stripping attrition mill permits introduction of air with the pieces of tire. The separated tread stock and pieces of carcass are cooled by the air current drawn through the mill, and then pass through the air conduit 14 and the line 15 to the cyclone collector 16, supplemental air being drawn in through the air conduit 14 and further cooling the material passing to the cyclone separator.

This operation of the stripping attrition mill for separating the tread rubber from the pieces of carcass may be performed e. g., at a rate of approximately 40 to 45 pounds per horsepower hour and constitutes a comparatively cool operation. In order to obtain additional cooling of the stock in and leaving this machine so as not to cause breakdown or injury of the stock through heating, and to aid in maintaining uniform temperature of the product, an effective pneumatic handling system is provided, such as the air conduits 14 and 15 with supplemental air drawn in through 14 in addition to that passing through the machine. The velocity of the air in the conduits 14 and 15 should be sufficient to convey the rubber and should also be sufficient to dissipate the heat generated in the attrition mill. The air required will depend on the horsepower used in the mill and the temperature of the air introduced into the mill and into the system through the manifold. In general, the temperature of the rubber should not rise higher than about 110° F.

The admixed coarse granular tread stock and pieces of carcass separating it from the air of the pneumatic system in the cyclone separator 16 pass through the outlet 17 onto a reciprocating screen 18 which in turn drops the admixed product into the air stream in the conduit 19, where the lighter, more fluffy carcass material is picked up by the air stream and carried into the collector 20 having an adjustable inlet opening 21 while the heavier tread rubber passes downwardly in the air conduit 19 against the air current. This separation removes the tread rubber of high specific gravity which has been cleaned from the carcass rubber and fibre and collects it separately from the carcass rubber. The air current for this separation is regulated by the fan 23 connected to the air inlet 22 of the collector 20 and the air taken from the top of this collector is free from rubber and carcass. After this preliminary separation of the tread rubber in the coarse granular state from the undisintegrated pieces of carcass material these materials are kept separate and separately treated.

The coarse granular tread rubber from the reciprocating screen 18 and air conduit 19 is conveyed by the pneumatic system through lines 26 and 27 to the cyclone collector 28 from the bottom of which the material is discharged onto a separator for separating trash and metal from the tread rubber. This separator is shown conventionally at 29 as a specific gravity separator. This separator may be of the shaking table and riffle type or of any other desired type which takes the place of any magnetic separation for the removal of steel or other magnetic metals as well as removing any non-ferrous metals, glass, cinders, etc., from the tread stock material, the trash and metal being separated at the discharge 30 and the coarse granular tread stock passing to the knife granulator 31 which is similar to the chopper 1 but equipped with a different size screen and operated to reduce the coarse granular tread stock material to a uniform granular size with a minimum amount of fine rubber dust. From the granulator 31, the material is conveyed by air through the pneumatic system 32 to the cyclone collector 33. The air of this pneumatic system and air which is drawn through the granulator tends to maintain a uniform temperature of the stock and to avoid objectionable overheating.

From the cyclone collector 33 the granular tread stock material passes to the screen 34 shown as a single deck scalping screen which serves to separate any oversize granules which are passed thru the screen in the chopper and returned through the pneumatic line 36 to the collector 28 so that they will be subjected to further processing and reduction of size by passing through the granulator 31 with fresh material.

The sized tread stock material passing through the scalper screen 34 is discharged into the air conduit 37 through which air is drawn upwardly through the line 38 and line 39 to the lint collector 40 while the sized tread stock passes downwardly through the conduit 37 against the current of air and is recovered in a substantially lint-free state. The scalping machine shown differs from the conventional scalper in that the aspiration, or light air suction, is used to remove any slight amount of lint which may have adhered to the tread rubber but which has been loosened in the graulating operation. While this amount of lint is not large, its removal gives a sized fibre-free tread rubber from which the lint has been removed and this tread rubber substantially free from admixed friction stock as well as from fibres forms one of the valuable products of the process.

Figure 2:
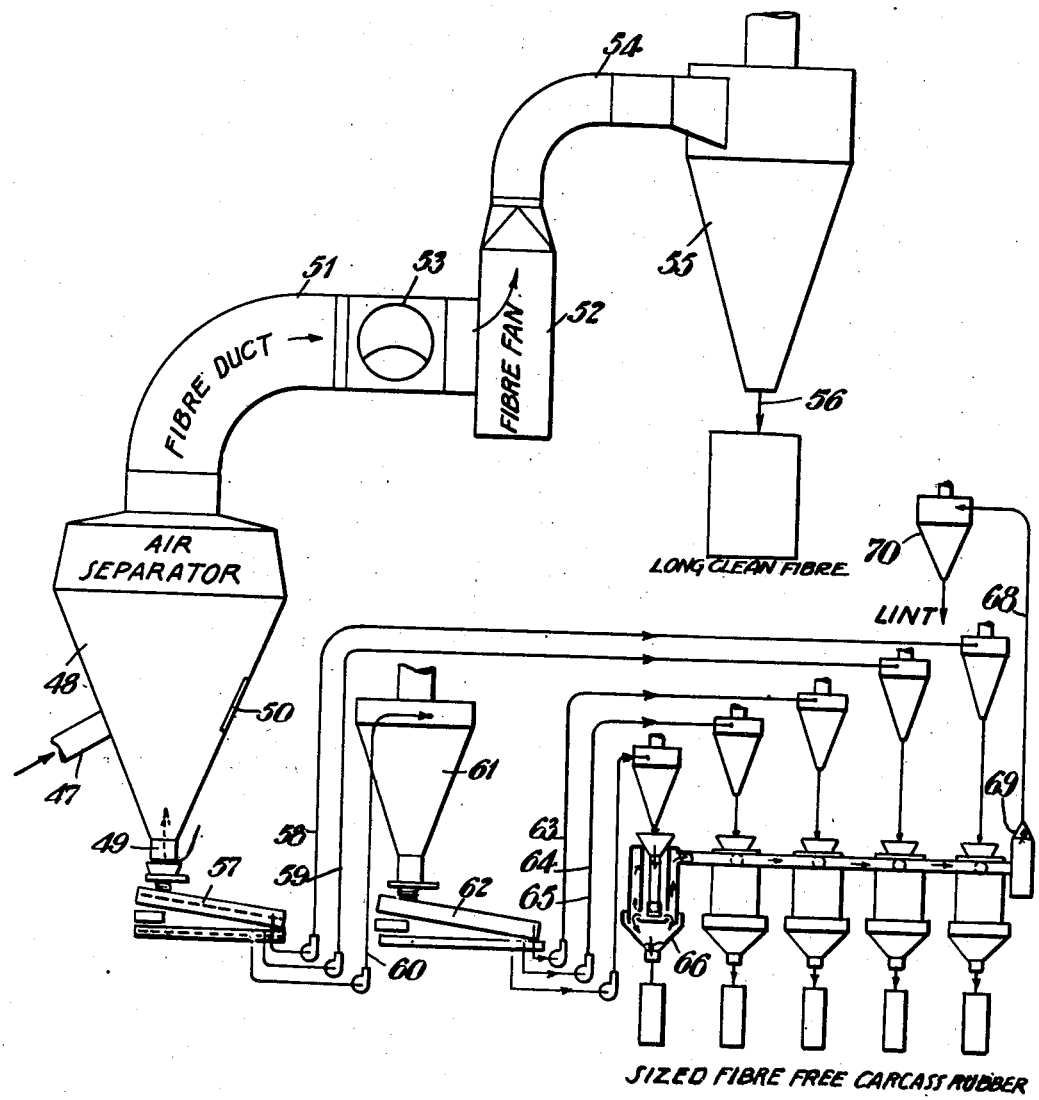

The pieces of tire carcass freed from tread stock collecting in the collector 20 are discharged through the rotary discharge valve 25 to the tire carcass conduit 41 through which a sufficient current of air is passed so that the pieces of carcass material are carried through a pneumatic system to the cyclone collector 42 and are fed therefrom to a stripping mill shown conventionally at 43 as a double head stripping attrition mill similar to that of Fig. 3 but with both discs rotatable and having inlet 44 for the stock and air and an outlet air conduit 45 with supplemental air inlet 46 and pneumatic line 47 leading to the air separator 48 of Fig. 2.

The double head stripping attrition mill 43 equipped with the same type of plates as the stripping attrition mill of Figs. 3 to 6 but with the rotating plates adjusted somewhat more closely together performs the operation of stripping the high gum content and very elastic friction rubber from the tire cord or fibre and breaks down the tire cord or fibre into individual threads or fibres. The action in this double head stripping attrition mill is e. g. about four times as intense as the action in a single head stripping attrition mill. This double head mill also reduces the carcass or friction rubber to a fine granular size of e. g., 6 mesh or finer. In this operation, the stripping attrition mill has a capacity of around 13 to 15 pounds per horsepower hour within the volumetric range of the machine according to its size. It is also important to equip this machine with an adequate pneumatic system which serves different purposes. The carcass material itself as introduced into this stripping attrition mill has a relatively low weight per cubic foot and since it is necessary to have weight or mass in order to impart direction to the stock, the pneumatic system is used to impart the weight or mass to the material along given lines of flow in the equipment. The drawing in of air with the stock serves this purpose and also serves the further purpose of cooling the stock while it is being acted upon. It is also important to supply sufficient additional air in the manifold of the pneumatic system to aid in dissipating the heat generated in the milling operation by an adequate introduction of cooling air through the stripping attrition mill and in the pneumatic system from the mill to the separator 48. The flow of the material through the mill can be regulated and controlled and the material cooled to dissipate heat generated.

The air separator 48 consists of a very large cyclone collector having its point of entry for stock approximately one-third up the side of the cone and with its outlet 49 for the heavy rubber through an open bottom of the cone while the lighter fibre is lifted out through a very large duct or fibre conduit 51 in very low velocity air through the top of the cyclone. The cyclone is shown as equipped with a sight glass 50 which enables the operator at all times to see the operation which is taking place within the low pressure area of the cyclone. The adjustment of the air in this area is made by a sleeve or slip valve 53 on the large duct 51 between the top of the cyclone and the fan 52, this adjustment permitting the introduction of air in the duct without going through the cyclone collector. The fibre fan 52 should be a type having sufficient volume to handle the air from the pneumatic system 41 as well as any air that was introduced through the bottom of the cyclone separator 48. This fan should also be able to handle the long fibres which are separated from the friction rubber in the separator 48 and pass them through the line 54 to the cyclone collector 55 where they are discharged as a long clean fibre at 56.

The friction rubber from the separator 48 is discharged in a substantially fibre-free state through the bottom outlet 49 to mechanical screens for grain sizing. The first screen 57 screens the material into three grain sizes collected as indicated at lines 58, 59 and 60, these screens giving sizes, e. g., of plus 6 mesh, through 6 on 8 mesh and through 8 mesh. The through 8 mesh material passes through the line 60 to a further collector 61 and then onto another screen 62 where further sizing of the material can be accomplished, e. g., into three fractions collected as indicated by lines 63, 64 and 65.

These screens shown conventionally perform the operation of screening the material into grain sizes where any fine lint which should happen to be mixed with these granules of rubber can be air separated from the various grain sizes through the means of an air separator 66, the lint being drawn off through air conduit 68 to lint collector 70 by fan 69. The mechanical sizing of the friction rubber prior to air separation enables the air separator to act upon the sized material to remove lint therefrom without picking up fine granules of rubber in so doing.

The air separators may be of conventional type with a feeder in the form of a tube which drops the granular material onto a revolving disc which throws the stock horizontally into a stream of vertical air entering the base of the separators 66. The heavy rubber drops into the air stream while the fine lint is lifted and carried to the lint collector by a suitable fan as shown. From these air separators, the friction rubber fraction is obtained in the form of sized fibre-free carcass rubber and the lint is separately recovered as a product of the process.

From the foregoing description it will be seen that the tread rubber and also the friction or carcass rubber are separately recovered each substantially free from the other type of rubber and without any objectionable heating of the rubber during the process or any objectionable change in the rubber composition, thus obtaining the tread rubber and the friction rubber in an uninjured state and substantially free from the fibre. The rubber is recovered without any objectionable caustic or chemical treatment and in a form which makes it well adapted for use for further reclaiming treatment or for use directly without reclaiming. It will also be seen that the tread stock is recovered substantially free from friction or carcass rubber and that the friction or carcass rubber is also recovered substantially free from tread stock, thus enabling the tread stock and the friction rubber to be separately used or to be recombined in any desired proportions which can readily be controlled.

It will also be seen that the process gives long, clean fibre from the cords or fabric of the carcass and also lint, both being substantially free from rubber and being useful for various purposes.

It will also be seen that the process involves a progressive treatment and separation of the tire with first chopping the debeaded tire to fairly coarse pieces, a separation of the tread stock in a coarse, granular form from the pieces of carcass and the separate treatment of the coarse, granular tread stock and of the pieces of carcass to give the final products in the form of sized, delinted tread stock freed from metal and trash and from fibres and lint as well as defibered and delinted friction or carcass rubber in sized condition and the substantially rubber-free fibres and lint. The entire operations are mechanical and pneumatic in character with control of temperature to prevent objectionable overheating, and with recovery of all of the values of the rubber tires in valuable forms.

Synthetic rubber tires as well as natural rubber tires can be treated according to the present invention and valuable rubber and fiber products produced.

In its broader aspects the invention is also applicable to the treatment of plastics other than rubber, particularly some of the rubber-like plastics which are combined with fabrics and where separation of plastic and fibres is desirable. But the invention is particularly advantageous for the treatment of rubber scrap such as automobile tires for the separate recovery of the valuable tread stock and friction stock substantially free from each other and from the fibres as well as the recovery of the fibres in a substantially rubber-free state.

I claim:

1. The method of mechanically treating used rubber tires containing embedded metallic and non-metallic foreign particles, which comprises chopping the tires into relatively coarse pieces, removing the tread rubber of said pieces in coarse granular form from the pieces of carcass and friction rubber adhering thereto, while leaving the pieces of carcass substantially undisintegrated, separating the removed granular tread rubber from the pieces of carcass, separating metallic and non-metallic particles of foreign material from the granular tread rubber, recovering the granular tread rubber substantially free from separated metallic and non-metallic particles, and from friction rubber and fibres of the carcass, cutting the granules of the tread rubber into smaller particles with a minimum of fine granules, delinting the resulting granular tread rubber, separating substantially all of the friction rubber, substantially free of tread rubber and in granular form from the pieces of fibres of the carcass, separately recovering the granular friction rubber and the remaining fibres, sizing and delinting the recovered granular friction rubber, and maintaining both the tread rubber and the friction rubber during their entire treatment at a temperature below that at which objectionable change in composition would take place, whereby there are recovered as products of the method, a fine granular tread rubber product substantially free from friction rubber and from fibres and foreign material, a sized granular friction rubber product substantially free from tread rubber and from fibres, and fibres substantially free from rubber and lint.

2. The method of mechanically treating used rubber tires containing embedded metallic and non-metallic foreign particles, which comprises chopping the tires into relatively coarse pieces, removing the tread rubber of said pieces in coarse granular form from the pieces of carcass and friction rubber adhering thereto, while leaving the pieces of carcass substantially undisintegrated, separating the removed granular tread rubber from the pieces of carcass, separating metallic and non-metallic particles of foreign material from the granular tread rubber, recovering the granular tread rubber substantially free from separated metallic and non-metallic particles, and from friction rubber and fibres of the carcass, separating substantially all of the friction rubber, substantially free of tread rubber and in granular form from the pieces of fibres of the carcass, separately recovering the granular friction rubber and the remaining fibres, sizing and delinting the recovered granular friction rubber, and maintaining both the tread rubber and the friction rubber during their entire treatment at a temperature below that at which objectionable change in composition would take place, whereby there are recovered as products of the method, a fine granular tread rubber product substantially free from friction rubber and from fibres and foreign material, a sized granular friction rubber product substantially free from tread rubber and from fibres, and fibres substantially free from rubber and lint.

3. The method of mechanically treating used tires which comprises chopping the tires into relatively coarse pieces, stripping the tread rubber in coarse granular form from the carcass of said tires while leaving pieces of carcass substantially undisintegrated, feeding the granular tread rubber and the pieces of the carcass in a current of cooling air to a separation zone, separating the granular tread rubber from the pieces of carcass in said zone, feeding the pieces of carcass into a stripping zone, breaking up the pieces of carcass in said stripping zone and stripping the friction rubber from the fibres thereof to give substantially rubber-free fibres, while simultaneously passing a current of cooling air around the pieces of carcass being treated, conveying the resultant admixed friction rubber and fibres, by a cooling air current, to a place of air separation, and separately recovering the fibres and substantially fibre-free friction rubber.

4. The method of mechanically separating the plastic material from adhering fibrous material which comprises chopping the material to be treated into relatively coarse pieces, stripping an outer layer of the plastic material in a coarse granular form from the fibrous material, while leaving the fibrous material substantially undisintegrated, feeding the coarse granular plastic and fibrous material with a current of cooling air to a separation zone, separating the coarse granular plastic from the pieces of fibrous material in said zone, feeding the pieces of fibrous material with air pressure to a stripping zone, breaking up the pieces of fibrous material in said stripping zone, and stripping adhering plastic from the fibres thereof to give substantially plastic-free fibres, while simultaneously passing a current of air over the pieces of fibrous material being treated, conveying the resulting admixed plastic and fibres by a cooling air current to a place of air separation, and separately recovering the fibres and substantially fibre-free plastic.

5. The method of mechanically separating tread rubber from the carcass of tires which comprises chopping tires into coarse pieces having a maximum length in any direction not substantially exceeding three and one-half inches, treating said pieces between relatively rotating plates of a stripping mill having teeth, while maintaining the plates so spaced that the teeth, on relative rotation of the plates, tear or strip the rubber tread from the carcass layers of said pieces and reduce it to a granular state, while leaving the carcass layers in a substantially undisintegrated state, separating the granular tread rubber from the layers of carcass material, passing the separated granular tread rubber to a knife granulator and there cutting it into particles of smaller size with the formation of a minimum of dust, passing the resulting product to an air separation zone and there separating lint.

6. The method of mechanically separating tread rubber from the carcass of tires as set forth in claim 5 in which metallic and non-metallic foreign material is removed from the separated tread rubber before it is passed to the knife granulator.

7. The method of mechanically separating tread rubber from the carcass of tires which comprises chopping tires into coarse pieces having a maximum length in any direction not substantially exceeding three and one-half inches, treating said pieces between relatively rotating plates of a stripping mill having teeth, while maintaining the plates so spaced that the teeth, on relative rotation of the plates, tear or strip the rubber tread from the carcass layers of said pieces and reduces it to a granular state, while leaving the carcass layers in a substantially undisintegrated state, separating the granular tread rubber from the layers of carcass material, placing the separated layers of carcass material separated from the granular tread rubber under compression, subjecting said layers of carcass material while under compression to a decorticating treatment to separate friction rubber adhering to the fibres thereof, separately collecting the separated friction rubber and the fibres, sizing the separately collected friction rubber into different grain sizes, and subjecting each grain size of friction rubber to air separation for the removal of lint therefrom.

8. The method of mechanically separating tread rubber from the carcass of tires which comprises chopping tires into coarse pieces having a maximum length in any direction not substantially exceeding three and one-half inches, treating said pieces between relatively rotating plates of a stripping mill having teeth, while maintaining the plates so spaced that the teeth, on relative rotation of the plates, tear or strip the rubber tread from the carcass layers of said pieces and reduce it to a granular state, while leaving the carcass layers in a substantially undisintegrated state, separating the granular tread rubber from the layers of carcass material, passing the separated granular tread rubber to a knife granulator and there cutting it into particles of smaller size with the formation of a minimum of dust, passing the resulting product to an air separation zone and there separating lint, placing the separated layers of carcass material separated from the granular tread rubber under compression, subjecting said layers of carcass material while under compression to a decorticating treatment to separate friction rubber adhering to the fibres thereof, separately collecting the separated friction rubber and the fibres, sizing the separately collected friction rubber into different grain sizes, and subjecting each grain size of friction rubber to air separation for the removal of lint therefrom.

EDWARD L. SCHENCK.

REFERENCES CITED

The following references are of record in the file of this patent:

UNITED STATES PATENTS

| Number | Name | Date |
|---|---|---|
| 122,289 | Smyser | Dec. 26, 1871 |
| 816,735 | Penther | Apr. 3, 1906 |
| 1,050,122 | Gare | Jan. 14, 1913 |
| 1,321,201 | Young | Nov. 11, 1919 |
| 1,401,795 | Kohler et al. | Dec. 27, 1921 |
| 1,607,291 | Marie | Nov. 16, 1926 |
| 1,653,472 | Scherbaum | Dec. 27, 1927 |
| 1,708,123 | Day | Apr. 9, 1929 |
| 2,126,672 | Smith et al. | Aug. 9, 1938 |
| 2,136,099 | Baxbaum | Nov. 8, 1938 |
| 2,226,429 | Hall | Dec. 24, 1940 |

FOREIGN PATENTS

| Number | Country | Date |
|---|---|---|
| 261,431 | Italy | Nov. 27, 1928 |